United States Patent
Griffin et al.

(10) Patent No.: US 6,499,300 B2
(45) Date of Patent: Dec. 31, 2002

(54) METHOD FOR OPERATING A POWER PLANT

(75) Inventors: Timothy Albert Griffin, Ennetbaden (CH); Dieter Winkler, Lauchringen (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/976,041

(22) Filed: Oct. 15, 2001

(65) Prior Publication Data

US 2002/0043064 A1 Apr. 18, 2002

Related U.S. Application Data

(60) Provisional application No. 60/239,938, filed on Oct. 13, 2000.

(30) Foreign Application Priority Data

Mar. 21, 2001 (CH) .............................................. 0515/01

(51) Int. Cl.[7] .............................................. F01K 25/06
(52) U.S. Cl. ...................... 60/649; 60/39.02; 60/39.182
(58) Field of Search ................. 60/649, 39.02, 60/39.182, 651, 39.181, 671

(56) References Cited

U.S. PATENT DOCUMENTS

| | | | |
|---|---|---|---|
| 4,434,613 A | * | 3/1984 | Stahl ........................ 60/39.182 |
| 5,861,441 A | * | 1/1999 | Waycuilis ................... 252/373 |
| 5,865,878 A | | 2/1999 | Drnevich et al. |
| 5,976,223 A | | 11/1999 | Prasad et al. |
| 6,130,259 A | * | 10/2000 | Waycuilis .................... 252/373 |
| 6,293,084 B1 | * | 9/2001 | Drnevich et al. .......... 60/39.17 |
| 6,298,664 B1 | * | 10/2001 | Ang.sen et al. ................ 60/649 |

FOREIGN PATENT DOCUMENTS

| | | |
|---|---|---|
| EP | 0882 486 A1 | 12/1998 |
| EP | 0939 199 A1 | 9/1999 |
| EP | 0953 748 A1 | 11/1999 |
| WO | WO 98/55208 | 12/1998 |
| WO | WO 98/55394 | 12/1998 |
| WO | WO 00/33942 | 6/2000 |

* cited by examiner

Primary Examiner—Hoang Nguyen
(74) Attorney, Agent, or Firm—Burns, Doane, Swecker & Mathis, L.L.P.

(57) ABSTRACT

A power plant and a method for operating a power plant with a $CO_2$ process is shown. The power plant includes a compressor, a turbine, a generator, a recuperator, and a burner unit with an oxygen separation device and a burner. Oxygen-containing gas, $CO_2$ medium from the $CO_2$ process, and fuel are supplied to the burner unit. The oxygen separation device removes oxygen from the oxygen-containing gas and adds it to the $CO_2$ medium. To improve the efficiency of the burner unit, the burner unit is provided with an additional burner. A portion of the oxygen-enriched $CO_2$ medium as well as fuel is fed to the additional burner. Hot $CO_2$ medium formed by the combustion in the additional burner is mixed with the heated $CO_2$ medium at the input of the oxygen separation device.

14 Claims, 2 Drawing Sheets

METHOD FOR OPERATING A POWER PLANT

This application claims the benefit of Provisional application Ser. No. 60/239,938, filed Oct. 13, 2000.

FIELD OF THE INVENTION

The invention relates to a method for operating a power plant with a closed or quasi closed $CO_2$ process, wherein the power plant includes at least one compressor, at least one turbine, at least one generator, at least one recuperator and at least one burner unit with at least one oxygen separation device and at least one burner, wherein the burner unit is supplied with oxygen-containing gas, compressed and heated $CO_2$ medium from the $CO_2$ process, and fuel or a fuel mixture. The invention also relates to a power plant having at least the above-described features.

BACKGROUND OF THE INVENTION

A conventional power plant as well as a method for operating such a power plant is disclosed in WO 98/55208. The disclosed power plant includes a turbine in its $CO_2$ cycle that drives a compressor and a generator via a common shaft. Also provided are a recuperator or heat exchanger as well as a burner unit, whereby this burner unit in the disclosed power plant comprises a first burner, an oxygen separation device, and a second burner. Oxygen-containing gas, for example, compressed ambient air, a compressed, heated $CO_2$ medium of the $CO_2$ process, and fuel are fed to the burner unit. The oxygen separation device contains oxygen separation means that remove oxygen from the oxygen-containing gas and feed it to the $CO_2$ medium. The oxygen separation device, therefore, on the one hand, reduces the oxygen content of the oxygen-containing gas, and on the other hand enriches the $CO_2$ medium with oxygen. The oxygen-enriched $CO_2$ medium is burned in the second burner following the oxygen separation device together with the fuel, producing hot $CO_2$ medium. This hot $CO_2$ medium is fed to the turbine and expanded there. The expanded $CO_2$ medium is then fed to the recuperator, where it cools down. Then the expanded and cooled $CO_2$ medium is fed to the compressor and is then heated in the recuperator. The heated and compressed $CO_2$ medium is then again fed to the inlet side of the oxygen separation device. This results in a closed or quasi closed $CO_2$ process, from which the damaging $CO_2$ can be removed with relatively little expenditure and without risk to the environment. Accordingly, the $CO_2$ emissions associated with the burning of fossil fuels can be significantly reduced in such a power plant.

The core idea of a power plant with $CO_2$ process is that pure oxygen is added as an oxidant to the $CO_2$ medium. The combustion process with molecular oxygen produces a waste gas consisting essentially only of $CO_2$ and $H_2O$, which significantly simplifies after treatment of this $CO_2$ medium, for example, in order to remove the $H_2O$ or $CO_2$.

Since oxygen, which is produced in refrigerated plants, is very expensive, new technologies have been developed for producing oxygen. In this context, oxygen separation devices that are provided with a membrane that conducts oxygen ions and electrons, so-called MCM membranes (mixed conducting membranes), play an important role. Such an MCM membrane is provided with a retention side, on which the oxygen-containing gas is located, and a pass-through side, on which the gas to be enriched, for example $CO_2$, is located. The MCM membrane transports oxygen ions from the retention side to the pass-through side and causes an electron transport from the pass-through side to the retention side. This causes oxygen to be removed from the gas on the retention side and to be fed to the gas on the passthrough side. In order to increase the efficiency of such an MCM membrane, it is advantageous to set a relatively high flow speed on the pass-through side so that the oxygen concentration on the pass-through side is as low as possible. It is advantageous for a long useful life of the MCM membrane to perform the following process steps independently from each other in separate units: Heating of the oxygen-containing gas, heating of the $CO_2$ medium, transport of the oxygen from the oxygen-containing gas to the $CO_2$ medium, and combustion of the oxygen-enriched $CO_2$ medium with fuel. The functional separation of these procedures makes it possible to optimize the individual process steps separately, whereby, in particular, the useful life of the MCM membrane can be increased. It is particularly important for the efficiency of the system that the oxygen separation device or its MCM membrane has an optimum operating temperature that is relatively high. To enable the MCM membrane to reach its high operating temperature, the $CO_2$ medium is preheated in the first burner preceding the oxygen separation device in a conventional power plant. The oxygen-containing gas is also preheated in a third burner preceding the oxygen separation device.

WO 98/55394 discloses a power plant in which the oxygen separation device is constructed as a so-called membrane reactor in which the enrichment of the $CO_2$ medium with oxygen and the combustion with the fuel take place more or less simultaneously. Such a membrane reactor essentially corresponds to an oxygen separation device with MCM membrane, which is, however, operated at substantially higher temperatures.

EP 0 953 748 A1 discloses a power plant in which the $CO_2$ medium is enriched with oxygen that is not produced with an oxygen separation device working with an MCM membrane, but with a cryotechnology plant.

Another power plant with $CO_2$ process in which the oxygen enrichment takes place with oxygen produced with cryotechnology is known from EP 0 939 199 A1.

U.S. Pat. No. 5,976,223 discloses a device for producing carbon dioxide and oxygen that works with two oxygen separation devices that each are equipped with an MCM membrane. The first oxygen separation device, which functions as a membrane reactor, is supplied with oxygen-containing gas that has been compressed and heated on the retention side. On the retention side, a gaseous fuel is supplied that reacts with the supplied oxygen and forms carbon dioxide. The oxygen-containing gas with reduced oxygen content is heated by the exothermic reaction that takes place during this process. The oxygen-containing gas heated in this manner is then fed to the second oxygen separation device on its retention side. The desired oxygen then accumulates on the pass-through side of this second oxygen separation device.

Other methods and devices provided with oxygen separation devices working with MCM membranes are known, for example, from EP 0 882 486 A1 and U.S. Pat. No. 5,865,878.

SUMMARY OF THE INVENTION

The present invention provides a power plant and a method of operating a power plant in which an optimum operating temperature for an oxygen separation device has been improved.

According to an embodiment of the invention, a portion of the $CO_2$ medium enriched with oxygen is burned in an additional burner following the oxygen separation device, and the oxygen enriched $CO_2$ medium is mixed with the $CO_2$ medium that has not yet been enriched with oxygen before it reaches the oxygen separation device. This measure makes it possible to increase the temperature of the $CO_2$ medium fed into the oxygen separation device to such an extent that an optimum operating temperature can be set or adjusted for the oxygen separation device. In particular, this makes it possible to compensate for heat losses. By optimizing the operating temperature of the oxygen separation device, its efficiency and therefore also the efficiency of the power plant, is improved.

In another aspect of an embodiment of the invention, the burner unit may be provided with a heat exchanger, through which again on one side the $CO_2$ medium flows upstream from the oxygen separation device, and on the other side the $CO_2$ medium flows downstream from the oxygen separation device, whereby hot $CO_2$ medium produced by the combustion in the additional burner is mixed downstream from the heat exchanger with the $CO_2$ medium heated in the heat exchanger. The $CO_2$ medium fed into the oxygen separation device is therefore heated primarily in the heat exchanger, whereby little external energy is required. The additional burner also compensates substantially for line losses and losses in the heat exchanger.

In an embodiment of the invention, the burner unit may be provided with at least one fuel cell that is supplied on the inlet side with the oxygen-enriched $CO_2$ medium as well as with fuel, whereby a reaction takes place in the fuel cell that removes oxygen from the $CO_2$ medium, heats the $CO_2$ medium, and generates electrical power. The overall efficiency of the power plant can be improved by integrating one or more fuel cells into the burner unit. It is preferable if the fuel cell is arranged with respect to the supply of the burner with $CO_2$ medium and fuel upstream from the burner, since this increases the process temperature in the burner and therefore also the temperature of the waste gases ($CO_2$ medium) produced in the burner. A higher temperature in the $CO_2$ process also increases the efficiency of the power plant.

If the oxygen-enriched $CO_2$ medium is cooled in a heat exchanger, it is useful to branch off the portion of the $CO_2$ medium necessary for the additional burner upstream from this heat exchanger, since this ensures that the heat exchanger then has a larger volume flow available and its efficiency is improved.

In accordance with an aspect of the invention, the flow temperature of the $CO_2$ medium to be enriched with oxygen can be increased prior to its entrance into the oxygen separation device by using an additional burner. Such an additional burner can be controlled and regulated especially easily according to demand, ensuring the setting and maintaining of an optimum operating temperature for the oxygen separation device. This is especially advantageous for oxygen separation devices that work with an MCM membrane.

BRIEF DESCRIPTION OF THE DRAWINGS

Preferred embodiments of the invention are shown in the drawings and will be explained in more detail in the following description.

DETAILED DESCRIPTION OF THE INVENTION

Figure 1:
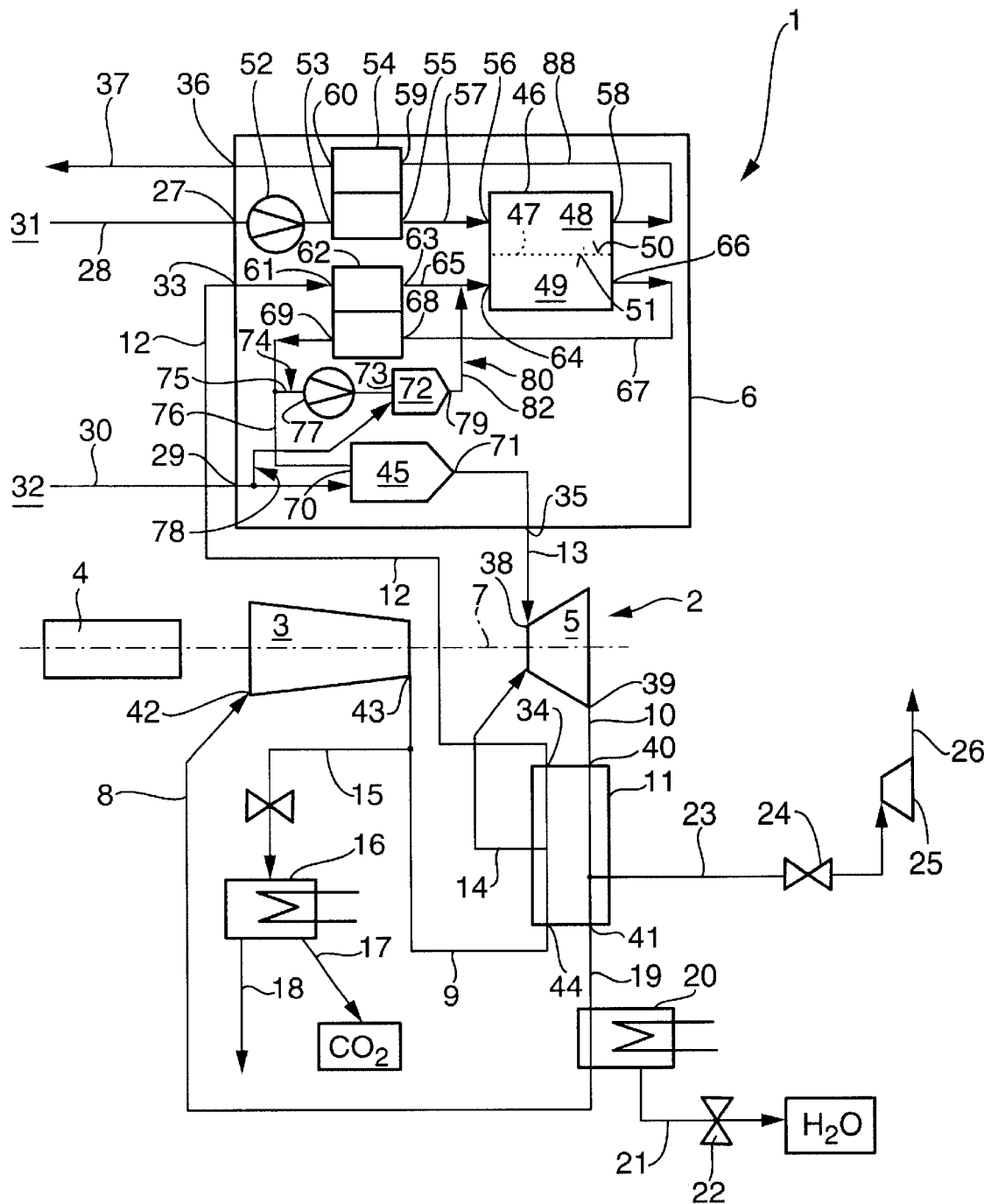
FIG. 1 is a block diagram representative of an embodiment of a power plant according to the invention.
Figure 2:
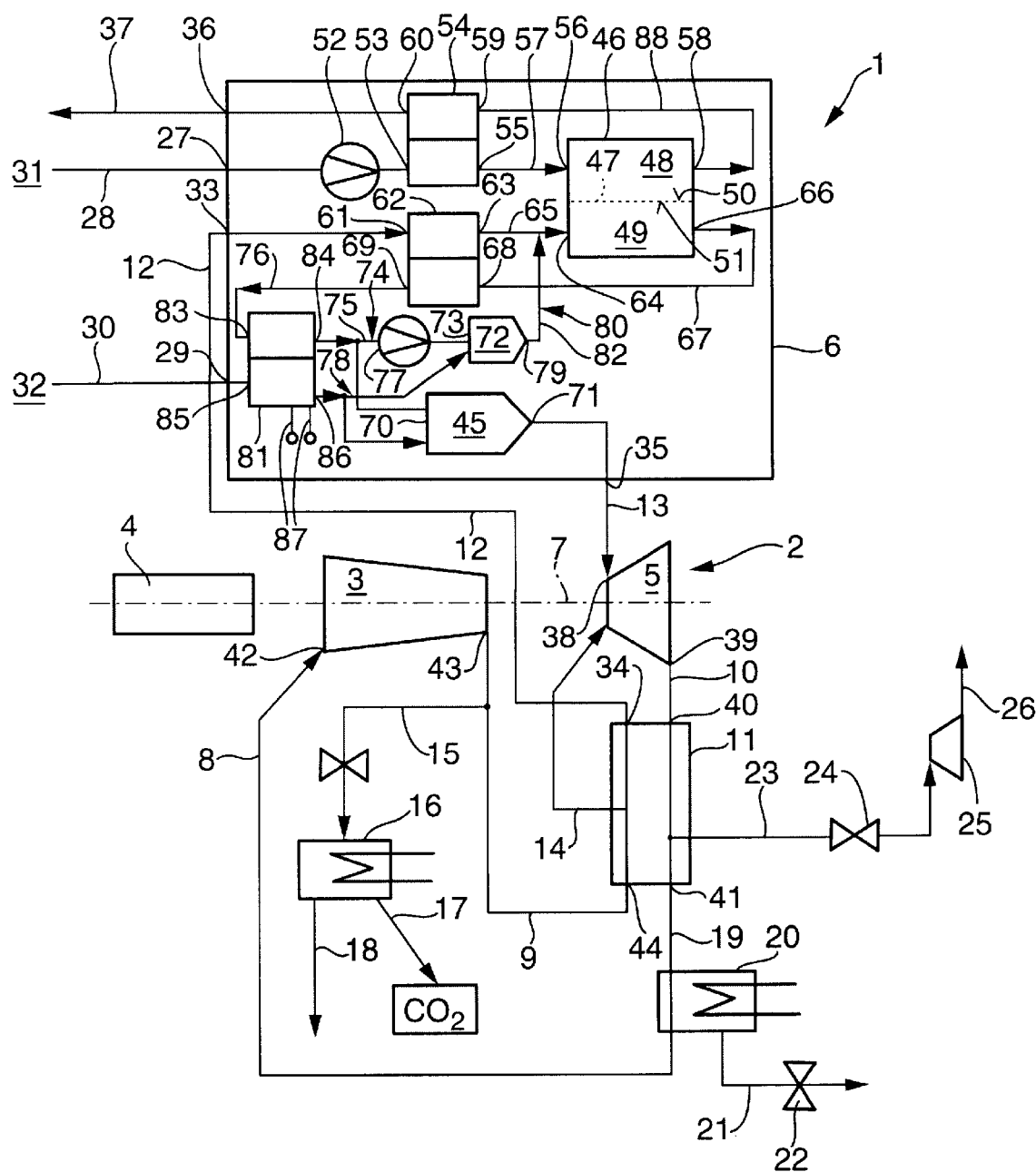
FIG. 2 is a block diagram representative of another embodiment of a power plant according to the invention.

Referring to FIGS. 1 and 2, a power plant 1 according to the invention is provided with a gas turbine or gas turbo group 2 with a closed or quasi closed $CO_2$ cycle. The gas turbo group 2 includes a compressor or compressor unit 3, a generator 4 coupled with this compressor 3, a turbine 5 coupled with the compressor 3, a burner unit 6 working between compressor 3 and turbine 5, which here is symbolized by a box. The turbo machines, i.e., the compressor 3 and turbine 5 can be coupled via a common shaft 7 that is indicated in the figures by a dot-slashed line.

The cycle medium 8 that is drawn in by the compressor 3, for example, has a pressure of about 10 bar at a temperature of about 25° C. on the inlet side, flows after compression as a compressed, cold cycle medium 9 in countercurrent direction through a recuperator or heat exchanger 11 impacted by hot, expanded waste gases 10 with a temperature of, for example, 800° C., and then flows, as a heated, compressed cycle medium 12, into the burner unit 6. In the burner unit 6, the cycle medium is calorically processed into hot gas, i.e., into a hot, compressed cycle medium 13 fed to the turbine 5.

In order to cool the thermally highly loaded aggregates of the gas turbo group 2, in particular the turbine 5, a portion 14 of the compressed cycle medium 9 can be branched off at an appropriate point, for example, in the recuperator 11, and be used to cool said aggregates, be it in closed and/or open flow paths. Here, only the cooling of the turbine 5 is suggested.

The cycle medium generally consists of $CO_2$, so the cycle medium will be referred to as $CO_2$ medium. In addition to $CO_2$, this $CO_2$ medium also may contain parasitic gases entrapped, for example, with the oxygen and fuel as well as during start-up with air. The $CO_2$ medium also may contain conversion products of the parasitic gases, for example, $NO_x$.

Once the $CO_2$ cycle has been charged, the excess $CO_2$ forming as a result of the combustion is continuously removed by intermittently or continuously branching off and condensing a portion of the $CO_2$ medium at a suitable point. In the embodiment shown in the figures, this $CO_2$ is removed in that a specific amount 15 of the compressed cold $CO_2$ medium 9 is branched off downstream from the compressor 9 and passed through a cooler 16 in which the $CO_2$ gas is preferably liquefied. After condensation, a liquefied $CO_2$ mass flow 17 is removed for disposal or suitable further processing. The liquefying of the $CO_2$ gas of the branched-off $CO_2$ medium 15 also causes the parasitic gases to be removed at the cooler 16, whereby a usually very small mass flow 18 can be subjected to further separation or—depending on the type of its components—can be released into the atmosphere.

Downstream from the recuperator 11, the precooled and expanded $CO_2$ medium 19 exiting there, which, for example, has a temperature of about 200° to 250° C., is passed through a heat sink 20 in which an amount of water is separated. The water 21 produced here can be removed via a control element 22. This heat sink is preferably operated at ambient temperature.

The exemplary embodiments shown in the figures also show an additional removal option that can be used to remove another portion 23 of the expanded $CO_2$ medium 10 at a suitable point from the recuperator in order to be used for a controlled supply 24 of an expander 25. The removed, expanded $CO_2$ medium, for example, can be returned to the $CO_2$ process. Condensation of the removed $CO_2$ medium 26 is also possible. Such an expander 25 can be used, for example, to charge the $CO_2$ cycle.

The burner unit 6 has a first inlet 27 that is connected to a feeding means 31 for feeding oxygen-containing gas, for example, air. This feeding means 31, for example, draws in atmospheric air 28 from the atmosphere. The burner unit 6 furthermore has a second inlet 29 that is connected to a feeding means 32 for feeding fuel 30 or a fuel/steam mixture. The burner unit 6 furthermore has a third inlet 33 that is connected to a first outlet 34 of the recuperator 11 and is supplied by the recuperator with heated, compressed $CO_2$ medium 12. Finally, the burner unit 6 has a first outlet 35, from which the hot, compressed $CO_2$ medium 13 exits from the burner unit 6, as well as a second outlet 36, from which gas 37 with a reduced oxygen content exits from the burner unit 6.

The first outlet 35 of the burner unit 6 is connected to an inlet 38 of the turbine 5, through which the hot, compressed $CO_2$ medium 13 enters the turbine 5. An outlet 39 of the turbine 5 is connected to a second inlet 40 of the recuperator 11, through which the expanded, hot $CO_2$ medium 10 enters the recuperator. A second outlet 41 of the recuperator 11 that communicates with the second inlet 40 is connected to an inlet 42 of the compressor 3, through which the cold, expended $CO_2$ medium 8 enters the compressor 3. An outlet 43 of the compressor 3 is then connected with a first inlet 44 of the recuperator 11 that communicates with the first outlet 34 of the recuperator 11 and through which the compressed, cold $CO_2$ medium 9 enters the recuperator 11.

The burner unit 6 contains at least one burner 45 as well as one oxygen separation device 46. This oxygen separation device 46 contains oxygen separation means, here constructed as an MCM membrane 47, which divide a first chamber 48 from a second chamber 49 in the oxygen separation device 46. The membrane 47 shown here as a dotted line has a retention side 50 exposed to the first chamber 48, as well as a pass-through side 51 exposed to the second chamber 49. The membrane 47 is constructed so that it transports oxygen from the first chamber 48 into the second chamber 49.

The first inlet 27 of the burner unit 6 is connected to the suction side of a fan 52 that is connected with a pressure side to a first inlet 53 of a first heat exchanger 54. A first outlet 55 of the first heat exchanger 54 communicating with the first inlet 53 is connected with a first inlet 56 of the oxygen separation device 46, whereby the cold, oxygen-containing gas 28 is heated in the first heat exchanger 54 so that heated, oxygen-containing gas 57 is fed to the first chamber 48 on the retention side 50 of the membrane 47. Then a hot gas 88 with reduced oxygen content exits from a first outlet 58 of the oxygen separation device 46 communicating with the first inlet 56. The first outlet 58 of the oxygen separation device 46 is connected with a second inlet 59 of the first heat exchanger 54, whereby the flow passes through it according to the counter-current principle. A second outlet 60 of the first heat exchanger 54 communicating with the second inlet 59 is connected to the second outlet 36 of the burner unit 6, so that in the first heat exchanger 54, cooled, oxygen-poor gas 37 exits from the first heat exchanger 54 or the burner unit 6.

The third inlet 33 of the burner unit 6 is connected to a second inlet 61 of a second heat exchanger 62 in which another heating of the compressed $CO_2$ medium 12 that has already been heated in the recuperator 11 takes place. A second outlet 63 of the second heat exchanger 62 communicating with the second inlet 61 is connected with a second inlet 64 of the oxygen separation device 46 so that compressed $CO_2$ medium 65 heated by the second heat exchanger 62 enters the second chamber 49 and therefore the pass-through side 51 of the membrane 47. The added $CO_2$ medium is then enriched with oxygen in the oxygen separation device 46. Accordingly, a hot, oxygen-enriched, compressed $CO_2$ medium 67 exits from the oxygen separation device 46 at a second outlet 66 of the oxygen separation device 46 that communicates with the second inlet 64. The second outlet 66 of the oxygen separation device 46 is connected with a first inlet 68 of the second heat exchanger 62 so that the hot, compressed, oxygen-enriched $CO_2$ medium 67 is used to heat the compressed $CO_2$ medium 12 fed to the second heat exchanger 62. A first outlet 69 of the second heat exchanger 62 communicating with the first inlet 68 is connected to an inlet 70 of the burner 45. The inlet 70 of the burner 45 is also connected with the second inlet 29 of the burner unit 6 and therefore with the fuel feeding mean 32. In the burner 45, the added fuel 30 burns together with the oxygen from the added $CO_2$ medium 76, whereby additional $CO_2$ and $H_2O$ forms. An outlet 71 of the burner 45 is connected with the first outlet 35 of the burner unit 6, so that the compressed, hot $CO_2$ medium 13 produced in the burner 45 exits from burner unit 6 at 35.

According to the invention, the burner unit 6 also has an additional burner 72 whose inlet 73 is supplied via a branch-off line 74 with a partial flow 75 of the oxygen-enriched $CO_2$ medium 76 that exits from the second heat exchanger 62. For this purpose, the branch-off line 74 is connected downstream from the second heat exchanger 62 to the connection between the first outlet 69 of the second heat exchanger 62 and the inlet 70 of the burner 45. The branch-off line 74 here contains a fan 77 that drives the partial flow 75. The inlet 73 of the additional burner 72 is supplied via fuel line 78 with the required fuel. An outlet 79 of the additional burner is connected via a return line 80 to the connection between the second outlet 63 of the second heat exchanger 62 and the second inlet 64 of the oxygen separation device 46. In this way hot $CO_2$ medium 82 produced in the additional burner 72 is mixed upstream from the second inlet 64 of the oxygen separation device 46 or in this second inlet 64 with the heated, compressed $CO_2$ medium 65 to be enriched with oxygen, which increases the temperature of the $CO_2$ medium 65 to be enriched with oxygen. Accordingly, the operating temperature of the oxygen separation device 46 can be increased.

In the variation according to FIG. 2, the burner 45 is preceded by a fuel cell 81 or a fuel cell arrangement, both with respect to the supply with oxygen-containing $CO_2$ medium 76 and with respect to the supply with fuel 30. Accordingly, a first inlet 83 of the fuel cell 81 is connected with the first outlet 69 of the second heat exchanger 62. A first outlet 84 of the fuel cell 81 communicating with the first inlet 83 is connected to the inlet 70 of the burner 45. In the embodiment shown here, the branch-off line 74 of the additional burner 72 branches off the connection between the fuel cell 81 and the burner 45 downstream from the fuel cell 81. A second inlet 85 of the fuel cell 81 is connected to the burner 6 and in this way is supplied by the fuel feeding means 32 with the required fuel 30. A second outlet 86 communicating with the second inlet 85 is connected to the inlet 70 of the burner 45. The fuel line 78 of the additional burner 72 here branches off the connection between fuel cell 81 and burner 45 downstream from the fuel cell 81.

In the fuel cell 81, the oxygen of the supplied $CO_2$ medium 76 reacts with the supplied fuel 30, whereby the fuel content of the $CO_2$ medium is reduced, the $CO_2$ medium is heated, and electrical power is generated. The electrical energy generated by the fuel cell 81 can be tapped, for example, at 87. The dimensions of the fuel cell 81 or fuel cell group are hereby designed so that only a portion of the oxygen of the supplied $CO_2$ medium 76 as well as only a portion of the supplied fuel 30 are used. This causes the subsequent combustion reaction of the burner 45 to take place at a higher temperature level so that the temperature of the $CO_2$ medium 13 finally exiting from the burner 45 can be higher than compared to the one in the embodiment according to FIG. 1. The higher process temperature results in an improved efficiency of the gas turbo group 2.

What is claimed is:

1. A method for operating a power plant with a closed or quasi closed $CO_2$ process, wherein the power plant comprises at least one compressor, at least one turbine, at least one generator, at least one recuperator and at least one burner unit with at least one oxygen separation device and at least one burner, wherein the burner unit is supplied with oxygen-containing gas, compressed and heated $CO_2$ medium from the $CO_2$ process, and fuel or a fuel/steam mixture, the method comprising:

removing oxygen from the oxygen-containing gas using the oxygen separation device and adding it to the $CO_2$ medium, wherein a combustion of the oxygen-enriched $CO_2$ medium with the fuel takes place in the at least one burner;

expanding hot, compressed $CO_2$ medium exiting from the at least one burner in the turbine;

cooling the expanded, hot $CO_2$ medium in the recuperator;

cooling the expanded $CO_2$ medium in the compressor;

heating the compressed, cooled $CO_2$ medium in the recuperator; and supplying an additional burner in the burner unit with a portion of the oxygen-enriched $CO_2$ medium as well as with fuel or fuel/steam mixture, whereby $CO_2$ medium formed by the combustion taking place in the additional burner is mixed with the heated $CO_2$ medium at the inlet of the oxygen separation device or upstream from the inlet.

2. The method according to claim 1, wherein:

the burner unit is provided with a heat exchanger, and the $CO_2$ medium flows through one side of the heat exchanger upstream from the oxygen separation device, and through the other side of the heat exchanger downstream from the oxygen separation device, such that hot $CO_2$ medium formed by the combustion in the additional burner is mixed with the $CO_2$ medium heated in the heat exchanger downstream from the heat exchanger.

3. The method according to claim 2, wherein the heat exchanger is arranged with respect to the supply of the additional burner with $CO_2$ medium upstream from the additional burner.

4. The method according to claim 1, wherein the burner unit is provided with at least one fuel cell that is supplied on the inlet side with the oxygen-enriched $CO_2$ medium and fuel or fuel/steam mixture, whereby a reaction takes place in the fuel cell that removes oxygen from the $CO_2$ medium, heats the $CO_2$ medium, and generates electrical power.

5. The method according to claim 4, wherein the fuel cell is arranged with respect to the supply of the burner and/or the additional burner with fuel and/or $CO_2$ medium upstream from the burner and/or from the additional burner.

6. The method according to claim 4, wherein the fuel cell is arranged with respect to the supply of the additional burner with $CO_2$ medium downstream from the heat exchanger.

7. A power plant with a $CO_2$ process, comprising:

at least one compressor, at least one turbine, at least one generator, at least one recuperator and at least one burner unit with at least one burner and at least one oxygen separation device;

a first inlet of the burner unit being connected with a means for feeding oxygen-containing gas;

a second inlet of the burner unit being connected with a means for feeding fuel or fuel/steam mixture;

a third inlet of the burner unit being connected with a first outlet of the recuperator from which heated, compressed $CO_2$ medium from the $CO_2$ medium process exits;

a first inlet of the recuperator communicating with the first outlet of the recuperator being connected to an outlet of the compressor, from which cold, compressed $CO_2$ medium exits;

an inlet of the compressor being connected with a second outlet of the recuperator, from which cooled, expanded $CO_2$ medium exits;

a second inlet of the recuperator communicating with the second outlet of the recuperator being connected to an outlet of the turbine, from which hot, compressed $CO_2$ medium exits;

an inlet of the turbine is connected with a first outlet of the burner unit, from which hot, compressed $CO_2$ medium exits;

a first inlet of the oxygen separation device is connected to the first inlet of the burner unit;

a first outlet of the oxygen separation device communicating with the first inlet of the oxygen separation device is connected to a second outlet of the burner unit, from which gas with a reduced oxygen content exits;

a second inlet of the oxygen separation device is connected to the third inlet of the burner unit;

the oxygen separation device contains oxygen separation means that remove oxygen from the oxygen-containing gas and add it to the $CO_2$ medium;

a second outlet of the oxygen separation device communicating with the second inlet of the oxygen separation device is connected with an inlet of the burner and supplies it with oxygen-enriched $CO_2$ medium;

the inlet of the burner is also connected to the second inlet of the burner unit;

an outlet of the burner is connected with the first outlet of the burner unit and supplies it with hot, compressed $CO_2$ medium that is produced by the combustion in the burner;

the burner unit has an additional burner;

a branch-off line branches off from the connection between the second outlet of the oxygen separation device and the inlet of the burner, the branch-off line supplying an inlet of the additional burner with a portion of the oxygen-enriched $CO_2$ medium;

the inlet of the additional burner is also connected to the second inlet of the burner unit; and an outlet of the additional burner is connected via a return line to the second inlet of the oxygen separation device.

8. The power plant according to claim 7, wherein the burner unit has a heat exchanger, a first inlet of the heat exchanger being connected to the second outlet of the oxygen separation device;

a first outlet of the heat exchanger communicating with the first inlet of the heat exchanger is connected to the burner;

a second inlet of the heat exchanger is connected to the third inlet of the burner unit;

a second outlet of the heat exchanger communicating with the second inlet of the heat exchanger is connected to the second inlet of the oxygen separation device; and the return line ends into the connection between the second outlet of the heat exchanger and the second inlet of the oxygen separation device.

9. The power plant according to claim 8, wherein the branch-off line branches off the connection between the first outlet of the heat exchanger and the inlet of the burner.

10. The power plant according to claim 7, wherein the burner unit has at least one fuel cell, a first inlet of the fuel cell being connected to the second outlet of the oxygen separation device;

a first outlet of the fuel cell communicating with the first inlet is connected to the inlet of the burner; and a second inlet of the fuel cell is connected to the second inlet of the burner unit, whereby a second outlet of the fuel cell communicating with the second inlet of the fuel cell is connected to the inlet of the burner.

11. The power plant according to claim 10, wherein a fuel line connected to the inlet of the additional burner branches off the connection between the second outlet of the fuel cell and the inlet of the burner.

12. The power plant according to claim 11, wherein the branch-off line connected to the inlet of the additional burner branches off the connection between the first outlet of the fuel cell and the inlet of the burner.

13. The power plant according to claim 10, wherein the first inlet of the fuel cell is connected to the first outlet of the heat exchanger.

14. The power plant according to claim 10, wherein the fuel cell is constructed as a high-temperature fuel cell.

* * * * *